No. 828,117. PATENTED AUG. 7, 1906.
C. F. JENKINS.
BOTTLE FILLING MACHINE.
APPLICATION FILED SEPT. 26, 1905.
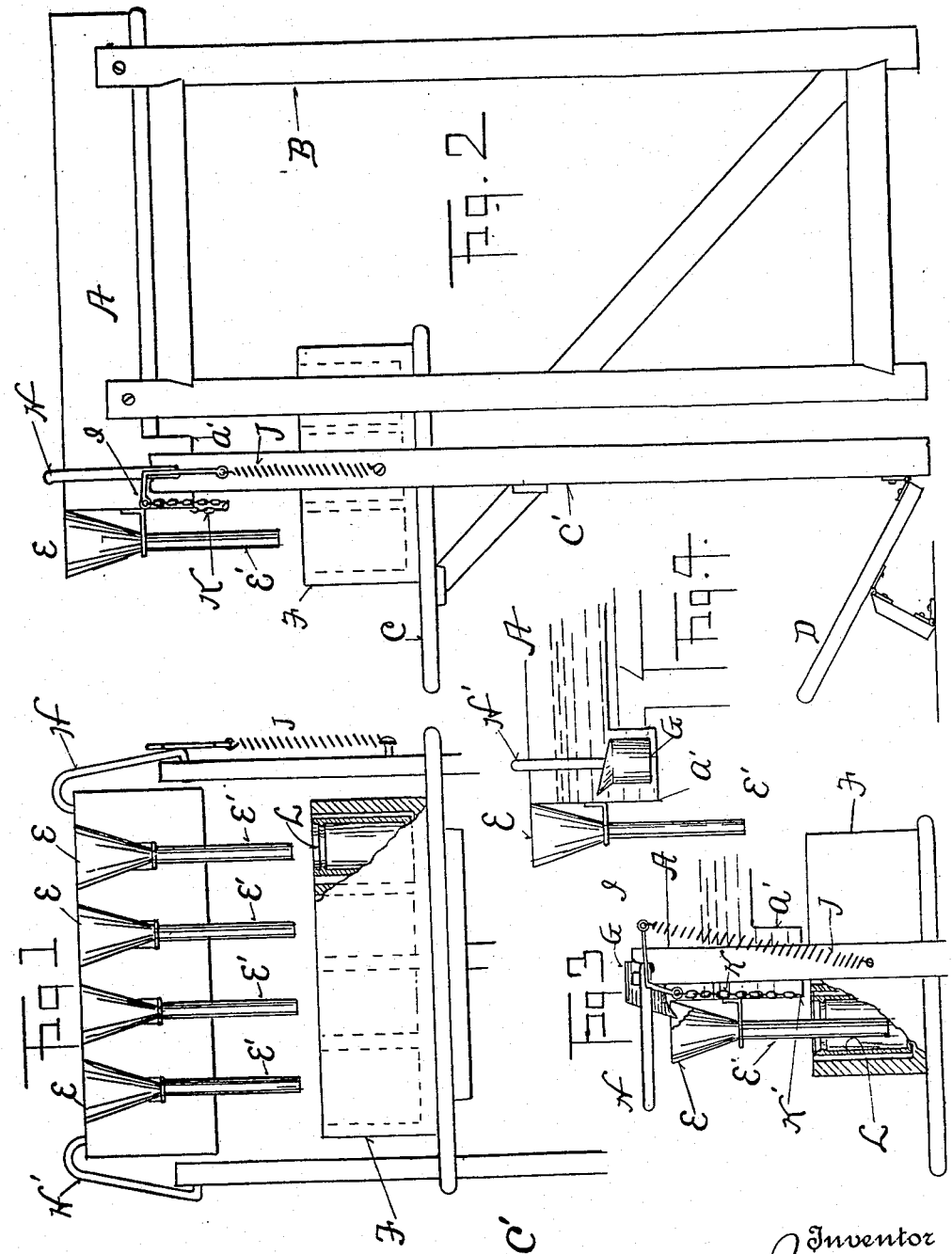
Witnesses
B. Griggs
Inventor
C. Francis Jenkins
Attorney

UNITED STATES PATENT OFFICE.

CHARLES FRANCIS JENKINS, OF WASHINGTON, DISTRICT OF COLUMBIA.

BOTTLE-FILLING MACHINE.

No. 828,117. Specification of Letters Patent. Patented Aug. 7, 1906.

Application filed September 26, 1905. Serial No. 280,138.

*To all whom it may concern:*

Be it known that I, CHARLES FRANCIS JENKINS, a citizen of the United States, residing at Washington, District of Columbia, have invented a certain new and useful Improvement in Bottle-Filling Machines, of which the following is a clear, full, and exact description.

This invention relates to the bottle-filler class generally, but particularly to that class of bottle-fillers handling milk—*i. e.*, milk-bottle-filling machines.

The present method of milk-bottle filling consists in filling the bottles either singly by hand or in multiple by machine until they overflow, with consequent froth and foam of the insucked air. The froth is allowed to subside when milk is again poured in to overflowing, and again a wait with a third filling. By this method the bottles are filled each time until the milk runs down over the sides onto the table on which they set and everything else connected therewith. This milk must either be thrown away, palpably an unpermitted waste, or it must be gathered up and put into bottles along with any dirt or uncleanness taken up meantime. Again, if filled by machine the milk is drawn off at the bottom and any sediment or precipitate is carried into the bottles with the inflowing milk. It has also been found that the use of valves or other rubbing surfaces under the milk causes little black specks, later found floating on the milk, and no substance suitable for valves which is free from these objections has yet been found. For gaskets rubber is frequently used, but the butter-fat and other oils in the milk and cream attacks it, making the rubber soft and worthless in a short time. It will therefore be seen that the problem of filling bottles with milk, containing as it does both oil and water, is very much more difficult of successful accomplishment in all probability than with any other liquid. The operation of the present invention not only eliminates this sloppy unsanitary condition by filling clean bottles with clean milk without froth or overflow, but a measured quantity of milk is put into each bottle, a saving over the present methods in use variously estimated by milkmen at from five to ten per cent. of the volume of milk handled daily.

The principal object of my invention is therefore to provide means whereby a measured quantity of clean milk is put into clean bottles without froth, overflow, or waste, and is accomplished in part by allowing the nozzles of the filler to empty near the bottom of the bottle and the elimination absolutely of all rubbing or contacting surfaces under the milk.

A second object is to provide spouts which will withdraw from the filled bottle without dripping.

These features are secured in the manner disclosed in the following specification and accompanying drawings, in which—

Figure 1 is a partial front view; Fig. 2, a side elevation, and Figs. 3 and 4 partial views of essential features of the device.

In all the figures like symbols refer to like elements, A being a tank or reservoir for milk, B a frame-stand supporting the reservoir, C a table fastened to the sliding frame C', actuated by the foot-treadle D. Fastened to the front of the reservoir A are a series of funnels E E E E with long nozzles so located that when the foot-treadle D is depressed, raising the table and crate F thereon, the nozzles will reach almost to the bottom of the bottles, as shown in Fig. 3. The reservoir A has a recess or depressed portion A' in which cups or measures G of a predetermined capacity are suspended, normally with the top coming about level with the bottom of the main portion of the reservoir, Fig. 2. These measures are fastened together and so located that they line up with the funnels, one for each funnel. Attached to the two outside measures of the row are bails H and H', journaled in the upper end of the sliding post C'. On the bail H a right-angularly-formed piece of wire with a ring in each end is located. To one ring is attached the spring J. To the other ring is attached one end of the chain K, the other end of the chain being attached to the lower front corner of the reservoir at K', Fig. 3.

When the foot-treadle D is depressed, lifting the frame C', the same action also carries up the bails H and H' and the measures C, to which they are attached, until the chain tightens, causing the measures to tip over, as shown in Fig. 3, discharging their contents into the funnels E, the lower ends of which empty the milk in the bottles L so close to the bottom that there is no foaming, and therefore the bottle is filled at the one operation and without overflow. On the return of frame K' and the table C to normal position the nozzles are withdrawn from the bottles and the crate F is moved until the nozzles come directly over another set of empty bottles, and the operation is repeated. The nozzles are coated with paraffin and do not drip.

The bottles here shown are those described in patent application, Serial No. 271,154, filed by me July 25, 1905, although the use of this machine is not, of course, limited to any particular kind of bottle or as to the number of bottles filled at each stroke.

The construction of the tank is such that the measures continue to fill each time until the tank is practically empty, while at the same time the depressed portion provides a settling-trough for sediment, the measures being filled over the top from milk above the bottom of the reservoir. The residue of milk and any settlings can be drawn off from the trough by a valve therein. (Not shown.) Thorough cleansing of the parts is readily accomplished because of the accessibility and absence of small or circuitous orifices, insuring pure clean milk.

What I claim, therefore, as my invention, and wish to protect by Letters Patent of the United States, is—

1. The combination with an upwardly-open reservoir and a vertically-movable support without the same, of a cup within the reservoir, an arm rigidly fixed to the cup and extending outside the reservoir and pivoted to said support, means for at will raising said support, and means whereby raising the support beyond a certain point rotates the cup and its arm about the pivotal axis of the latter.

2. The combination with an upwardly-open reservoir and a funnel alongside the same, of a measuring-cup within the reservoir, a vertically-movable frame without the reservoir, a bottle-supporting table mounted upon the frame below said funnel, an arm fixed to the cup and extending outside the reservoir and pivoted to the frame, means for at will raising the frame until the funnel nearly reaches the bottom of a bottle properly placed upon the table and the body of the cup is above the reservoir, and means whereby such raising tilts the cup about the axis of its arm.

3. The combination with an upwardly-open reservoir, of a series of rigidly-connected cups within the reservoir, a corresponding series of funnels alongside the reservoir, a vertically-movable frame without the reservoir, a table carried by the frame and normally below said funnels, arms fixed to the cups, extending outside the reservoir and pivoted to said frame, means for at will raising the frame, table, cups and arms until the bodies of the cups are above the reservoir, and automatic means for tilting the cups near the end of such rising movement.

4. The combination with an upwardly-open reservoir, of a set of rigidly-connected measuring-cups within the same, vertically-movable supports without the reservoir, rigid arms fixed to the cups, extending over the walls of the reservoir and pivoted to said supports, springs resisting the swinging of said arms and cups about their pivotal axis, and means whereby raising said supports beyond a certain point overcomes the resistance of the springs and tilts the cups.

5. The combination with an upwardly-open reservoir, of a set of funnels alongside one wall of the reservoir, a corresponding set of cups within the reservoir alongside the same wall, a vertically-movable, bottle-supporting table below said funnels, a single means for raising both the table and the cups simultaneously, and automatic means for tilting the cups toward the funnels when such raising carries them above the reservoir.

C. FRANCIS JENKINS.

Witnesses:
J. JEROME LIGHTFOOT,
JAMES L CRAWFORD.